(12) United States Patent
Okuwa et al.

(10) Patent No.: US 11,840,960 B2
(45) Date of Patent: Dec. 12, 2023

(54) GAS TURBINE ENGINE

(71) Applicant: KAWASAKI JUKOGYO KABUSHIKI KAISHA, Kobe (JP)

(72) Inventors: Tatsuya Okuwa, Kobe (JP); Takafumi Fujii, Kobe (JP); Atsunori Arai, Kobe (JP); Hayato Hirota, Kobe (JP); Atsuki Matsuoka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/799,004

(22) PCT Filed: Feb. 12, 2021

(86) PCT No.: PCT/JP2021/005257
§ 371 (c)(1),
(2) Date: Aug. 11, 2022

(87) PCT Pub. No.: WO2021/162092
PCT Pub. Date: Aug. 19, 2021

(65) Prior Publication Data
US 2023/0108755 A1    Apr. 6, 2023

(30) Foreign Application Priority Data
Feb. 14, 2020 (JP) ................. 2020-023237

(51) Int. Cl.
*F02C 7/06* (2006.01)
*F01D 25/16* (2006.01)
*F01D 25/18* (2006.01)

(52) U.S. Cl.
CPC ............... *F02C 7/06* (2013.01); *F01D 25/16* (2013.01); *F01D 25/18* (2013.01);
(Continued)

(58) Field of Classification Search
CPC . F02C 7/06; F01D 25/16; F01D 25/18; F01D 25/164; F05D 2220/32;
(Continued)

(56) References Cited

U.S. PATENT DOCUMENTS

2013/0084035 A1*  4/2013  Williams ............ F16C 33/6659
                                                     384/492
2016/0298639 A1* 10/2016  Brault .................... F04D 29/056
(Continued)

FOREIGN PATENT DOCUMENTS

JP    H05280532 A  *  3/1992
JP    05-280532 A    10/1993
(Continued)

OTHER PUBLICATIONS

International Search Report for PCT/JP2021/005257, dated Apr. 6, 2021.

*Primary Examiner* — Yi-Kai Wang
(74) *Attorney, Agent, or Firm* — Sughrue Mion, PLLC

(57) ABSTRACT

A gas turbine engine including a compressor that compresses air taken in; a combustor that sprays a fuel into the compressed air and combusts the fuel; a turbine rotated by energy of the combustion gas generated by the combustor; a rotating shaft coupling the compressor and the turbine; a rear bearing that is a cageless ball bearing including an inner race, an outer race, and a ball, the inner race being fixed to a portion of the rotating shaft which portion is close to the turbine; a housing to which the rear bearing is attached; and a rear bearing holding member that is interposed between the rear bearing and the housing and holds the outer race of the rear bearing such that the outer race of the rear bearing is movable in an axial direction relative to the housing.

7 Claims, 4 Drawing Sheets

(52) U.S. Cl.
CPC ...... *F05D 2220/32* (2013.01); *F05D 2240/54* (2013.01); *F05D 2260/98* (2013.01)

(58) Field of Classification Search
CPC ............. F05D 2240/54; F05D 2260/98; F05D 2260/38; F16C 19/02; F16C 27/04; F16C 35/042; F16C 35/077; F16C 2240/84; F16C 2360/23; F16N 2210/02; F16N 2210/14; F16N 7/32; F16N 7/38
USPC ........................................................ 415/229
See application file for complete search history.

(56) References Cited

U.S. PATENT DOCUMENTS

| | | | |
|---|---|---|---|
| 2017/0276173 A1* | 9/2017 | Smedresman | ........ F01D 25/164 |
| 2020/0141281 A1 | 5/2020 | Ikeguchi et al. | |

FOREIGN PATENT DOCUMENTS

| | | |
|---|---|---|
| JP | 2019-002376 A | 1/2019 |
| WO | 2017/148890 A1 | 9/2017 |

\* cited by examiner

US 11,840,960 B2

GAS TURBINE ENGINE

CROSS REFERENCE TO RELATED APPLICATIONS

This application is a National Stage of International Application No. PCT/JP2021/005257 filed Feb. 12, 2021, claiming priority based on Japanese Patent Application No. 2020-023237 filed Feb. 14, 2020E, the entire contents of which are incorporated herein by reference.

TECHNICAL FIELD

The present disclosure relates to a gas turbine engine.

BACKGROUND ART

A gas turbine engine includes a rotating shaft that couples a compressor and a turbine. A bearing (rear bearing) that supports the rotating shaft is attached to a portion of the rotating shaft which portion is close to the turbine (see PTL 1, for example).

CITATION LIST

Patent Literature

PTL 1: Japanese Laid-Open Patent Application Publication No. 2019-2376

SUMMARY OF INVENTION

Technical Problem

Since a combustion gas flows through the vicinity of the rear bearing, the rear bearing tends to become high in temperature. Especially, seizure of a cage that holds rolling elements, such as balls or rollers, among components of the rear bearing tends to occur. Therefore, a cageless bearing may be adopted as the rear bearing. However, the cage of a roller bearing including the rollers as the rolling elements cannot be omitted in terms of structure, and the cageless bearing is inevitably a ball bearing.

Thermal expansion of a housing to which an outer race of the rear bearing is fixed is larger than thermal expansion of the rotating shaft to which an inner race of the rear bearing is fixed. Therefore, when the gas turbine engine starts operating, a positioning error between the outer race and the inner race in an axial direction occurs. When the ball bearing is adopted as the rear bearing, this positioning error may not be absorbed.

An object of the present disclosure is to provide a gas turbine engine which can adopt as a rear bearing a cageless ball bearing whose seizure hardly occurs.

Solution to Problem

A gas turbine engine according to one aspect of the present disclosure includes: a compressor that compresses air which has been taken in; a combustor that sprays a fuel to the air compressed by the compressor and combusts the fuel; a turbine that is rotated by energy of a combustion gas generated by the combustor; a rotating shaft that couples the compressor and the turbine; a rear bearing that is a cageless ball bearing including an inner race, an outer race, and a ball, the inner race being fixed to a portion of the rotating shaft which portion is close to the turbine; a housing to which the rear bearing is attached; and a rear bearing holding member that is interposed between the rear bearing and the housing and holds the outer race of the rear bearing such that the outer race of the rear bearing is movable in an axial direction relative to the housing.

According to this configuration, the outer race of the rear bearing is held so as to be movable in the axial direction relative to the housing. Therefore, even if the positioning error between the housing and the rotating shaft in the axial direction occurs by the thermal expansion, a large positioning error between the outer race and the inner race of the rear bearing does not occur. On this account, according to the above configuration, a cageless ball bearing can be adopted as the rear bearing.

Advantageous Effects of Invention

The present disclosure can provide a gas turbine engine which can adopt as a rear bearing a cageless ball bearing whose seizure hardly occurs.

DESCRIPTION OF EMBODIMENTS

Figure 1:
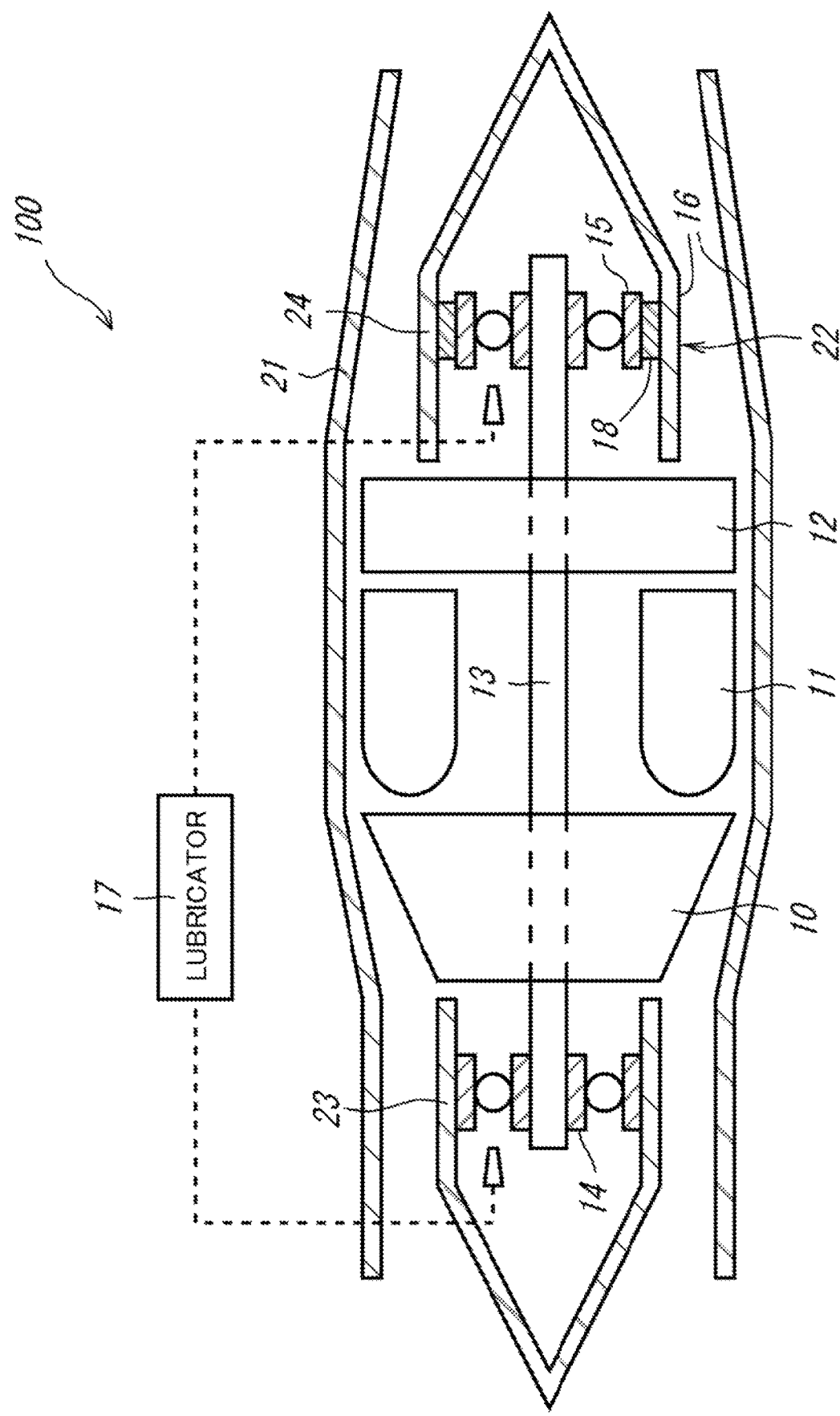
FIG. 1 is a schematic diagram of a gas turbine engine.

Hereinafter, a gas turbine engine (hereinafter simply referred to as an "engine") 100 according to an embodiment will be described. FIG. 1 is a schematic diagram of the engine 100. Hereinafter, a left side on a paper surface of FIG. 1 is referred to as a "front side," and a right side on the paper surface of in FIG. 1 is referred to as a "rear side."

The engine 100 of the present embodiment takes in air from the front side and discharges a combustion gas to the rear side. The engine 100 may be a single-shaft gas turbine engine or a two-shaft gas turbine engine. As shown in FIG. 1, the engine 100 includes a compressor 10, a combustor 11, a turbine 12, a rotating shaft 13, a front bearing 14, a rear bearing 15, a housing 16, a lubricator 17, and a rear bearing holding member 18. These components will be described in order.

The compressor 10 is a component that compresses air which has been taken in. The compressor 10 may be: an axial compressor that compresses air which has been taken in from the front side, and supplies the air to the rear side; a centrifugal compressor that supplies the compressed air outward in a radial direction; or a combination thereof. The air compressed by the compressor 10 is supplied to the combustor 11 located downstream of the compressor 10.

The combustor 11 is a component that sprays a fuel to the air compressed by the compressor 10 and combusts the fuel. The fuel used in the engine 100 is not especially limited, and the type of the combustor 11 is not especially limited. In the combustor 11, a high-temperature and high-pressure combustion gas is generated by combusting the fuel. The combustion gas is supplied to the turbine 12 located downstream of the combustor 11.

The turbine 12 is rotated by energy of the combustion gas generated by the combustor 11. The turbine 12 may be: an axial turbine into which the combustion gas flows from the front side and through which the combustion gas flows to the rear side; a centrifugal turbine through which the combustion gas flows outward in the radial direction; or a combination thereof.

The rotating shaft 13 is a member that couples the compressor 10 and the turbine 12. The rotating shaft 13 extends in an axial direction (front-rear direction) of the engine 100. The rotating shaft 13 of the present embodiment is formed integrally but may be formed by coupling shafts to each other.

The front bearing 14 is a bearing attached to a portion of the rotating shaft 13 which portion is close to the compressor 10. The front bearing 14 of the present embodiment is located at the front side of the compressor 10. However, an axial position of the front bearing 14 may overlap an axial position of the compressor 10. To be specific, the front bearing 14 may be located at a radially inner side of the compressor 10. Based on the flow of the air, the front bearing 14 is located at a portion, located upstream of the combustor 11, of the rotating shaft 13 or its vicinity, and the air taken in by the compressor 10 flows around the front bearing 14. Therefore, the front bearing 14 hardly becomes high in temperature as compared to the below-described rear bearing 15 around which the combustion gas flows.

Figure 2:
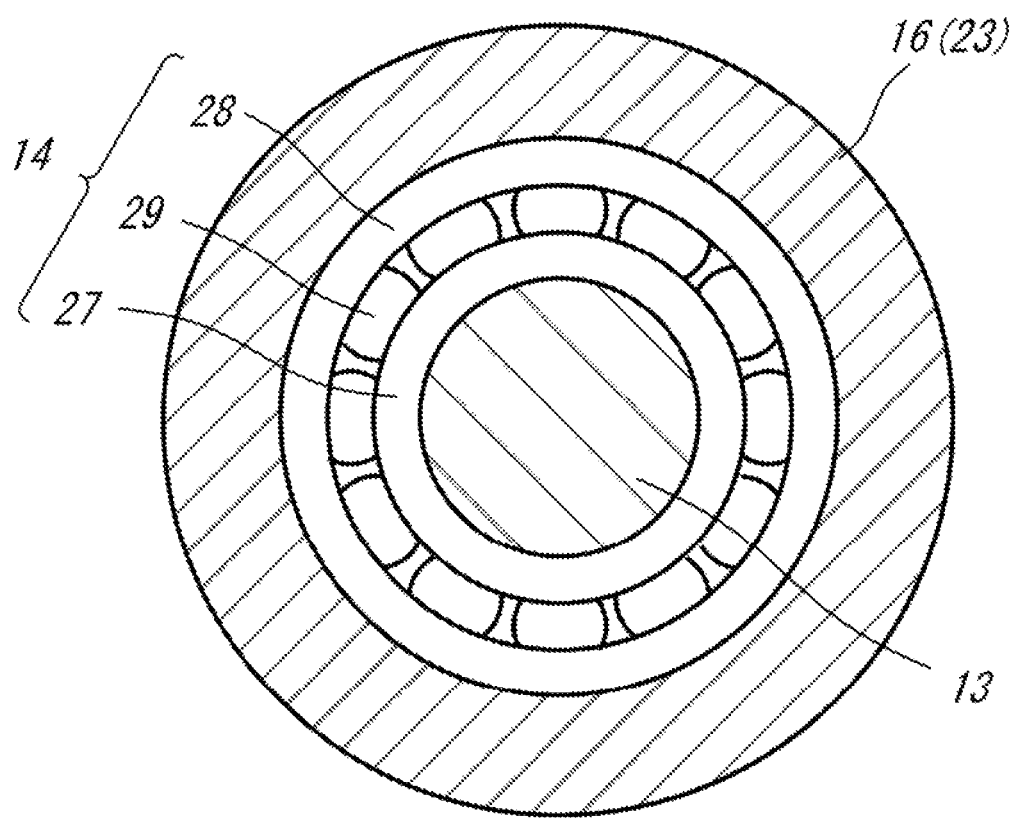
FIG. 2 is a diagram showing a front bearing and its vicinity when viewed in an axial direction.

FIG. 2 is a diagram showing the front bearing 14 and its vicinity when viewed in the axial direction. As shown in FIG. 2, the front bearing 14 is a cageless ball bearing that includes an inner race 27, an outer race 28, and balls 29 but does not include a cage that holds the balls 29 therein. However, the front bearing 14 may include a cage and may be a roller bearing. Omitting the cage from the roller bearing is impossible in terms of structure, and the cageless bearing is inevitably a ball bearing.

Moreover, the front bearing 14 of the present embodiment is a ceramic bearing in which the inner race 27, the outer race 28, and the balls 29 are made of ceramics or a hybrid bearing in which the inner race 27 and the outer race 28 are made of metal, and the balls 29 are made of ceramics. However, all of the inner race 27, the outer race 28, and the balls 29 may be made of metal.

The inner race 27 of the front bearing 14 is fixed to the rotating shaft 13, and the outer race 28 of the front bearing 14 is fixed to the housing 16 (front housing 23). Therefore, the front bearing 14 cannot move in the axial direction relative to the rotating shaft 13 and the housing 16. To be specific, a portion of the rotating shaft 13 and a portion of the housing 16 which portions correspond to the front bearing 14 serve as a reference point, and a positioning error in the axial direction does not occur at the reference point.

The rear bearing 15 is a bearing attached to a portion of the rotating shaft 13 which portion is close to the turbine 12. As shown in FIG. 1, the rear bearing 15 of the present embodiment is located at the rear side of the turbine 12. However, an axial position of the rear bearing 15 may overlap an axial position of the turbine 12. To be specific, the rear bearing 15 may be located at a radially inner side of the turbine 12. Based on the flow of the combustion gas, the rear bearing 15 is located at a portion, located downstream of the combustor 11, of the rotating shaft 13 or its vicinity, and the combustion gas flows around the rear bearing 15. Therefore, the rear bearing 15 tends to become high in temperature.

Figure 3:
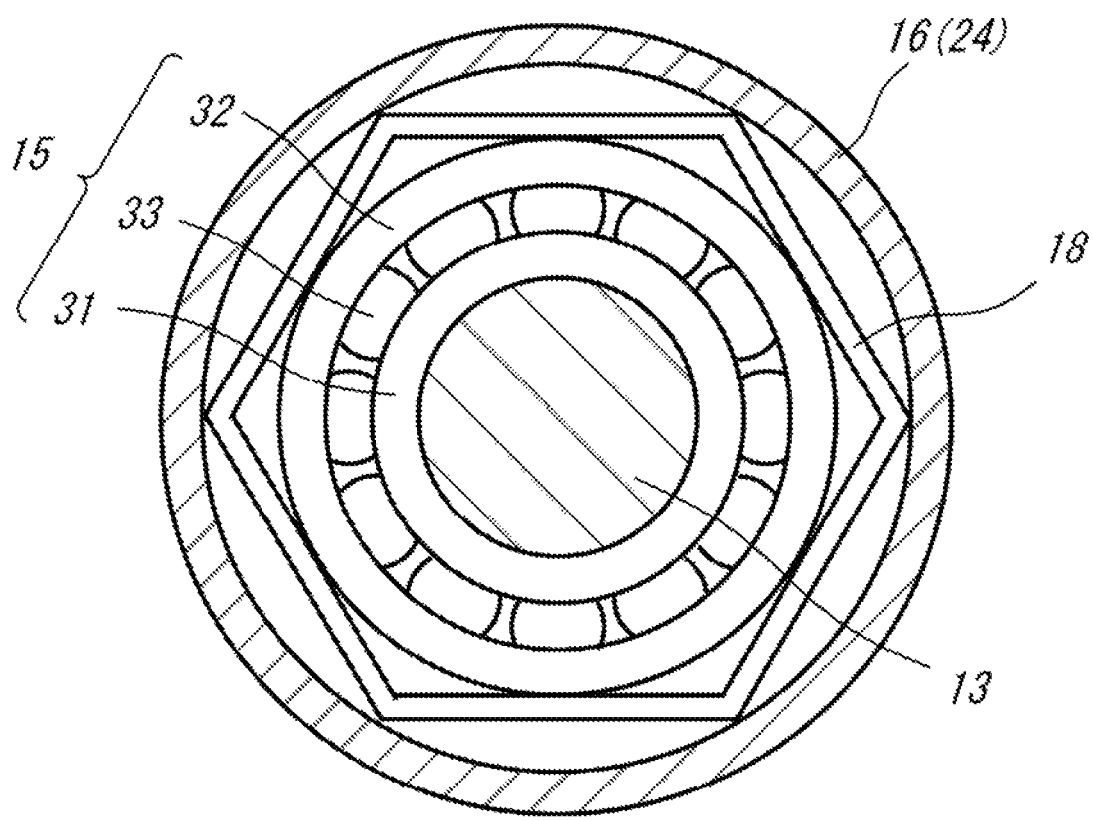
FIG. 3 is a diagram showing a rear bearing and its vicinity when viewed in the axial direction.

FIG. 3 is a diagram showing the rear bearing 15 and its vicinity when viewed in the axial direction. As shown in FIG. 3, the rear bearing 15 is a cageless ball bearing that includes an inner race 31, an outer race 32, and balls 33 but does not include a cage that holds the balls 33. Since the cage is omitted, seizure of the cage does not occur, and seizure of the entire rear bearing 15 can be suppressed.

Moreover, the rear bearing 15 of the present embodiment is a ceramic bearing in which the inner race 31, the outer race 32, and the balls 33 are made of ceramics or a hybrid bearing in which the inner race 31 and the outer race 32 are made of metal, and the balls 33 are made of ceramics. However, all of the inner race 31, the outer race 32, and the balls 33 may be made of metal. When the rear bearing 15 is the ceramic bearing or the hybrid bearing, the seizure of the rear bearing 15 can be further suppressed.

In the engine 100 according to the present embodiment, the rotating shaft 13 is supported by the front bearing 14 and the rear bearing 15. However, in addition to these bearings, the engine 100 may include another bearing that supports the rotating shaft 13. To be specific, the engine 100 may include three or more bearings.

As shown in FIG. 1, the housing 16 includes an outer housing 21 and an inner housing 22. The outer housing 21 forms an outer shell of the engine 100, and the inner housing 22 is located inside the outer housing 21. The outer housing 21 and the inner housing 22 form a passage of the air and the combustion gas. Moreover, the inner housing 22 includes a hollow front housing 23 and a hollow rear housing 24. The front housing 23 is located at the front side of the compressor 10, and the rear housing 24 is located at the rear side of the turbine 12. The outer housing 21 and the inner housing 22 are coupled to each other by a post or a stationary blade extending in a radial direction between the outer housing 21 and the inner housing 22.

Moreover, a material of the housing 16 and a material of the rotating shaft 13 are different from each other. Therefore, the housing 16 and the rotating shaft 13 are different in the coefficient of thermal expansion from each other, and the housing 16 and the rotating shaft 13 are different in the amount of change of an axial dimension by the thermal expansion from each other. Therefore, when the engine 100 starts, the positioning error in the axial direction is generated between the rotating shaft 13 and the housing 16. To be specific, a portion of the rotating shaft 13 and a portion of the housing 16 which have been located at the same axial position before the operation of the engine 100 are located at different axial positions from each other after the operation of the engine 100. The above positioning error increases in a direction away from the portion corresponding to the front bearing 14 as the reference point. When the housing 16 and the rotating shaft 13 are different in temperature from each other although the material of the housing 16 and the material of the rotating shaft 13 are the same as each other, the positioning error in the axial direction by the thermal expansion occurs.

The lubricator 17 is a device that supplies lubricating oil to the front bearing 14 and the rear bearing 15. The lubricator 17 of the present embodiment is a non-circulation lubricator that injects disposable lubricating oil to the front bearing 14 and the rear bearing 15. Specifically, the lubricator 17 mixes the lubricating oil with the compressed air extracted from the compressor 10, and injects a mixture of the oil and the air to the front bearing 14 and the rear bearing 15. The lubricator 17 may inject the lubricating oil without mixing the lubricating oil with the compressed air and may be a circulation lubricator that collects and reuses the used lubricating oil.

The lubricator 17 of the present embodiment can be manufactured at low cost since the lubricator 17 does not have to include a mechanism that circulates the lubricating oil. On the other hand, the amount of lubricating oil supplied to the bearings 14 and 15 by the lubricator 17 is smaller than that by a circulation lubricator. Therefore, in the present embodiment, coolability of cooling the bearings 14 and 15 by the lubricating oil is limited. Especially, the seizure of the rear bearing 15 that becomes high in temperature tends to occur. However, as described above, since a bearing that is a hybrid bearing and is a cageless ball bearing is adopted as the rear bearing 15 of the present embodiment, the seizure of the rear bearing 15 is suppressed. However, there is a problem that due to the positioning error between the inner race and the outer race in the axial direction, the ball bearing breaks more easily than the roller bearing.

Moreover, there is another problem that when the amount of lubricating oil supplied to the rear bearing 15 is small, a vibration damping effect of the rear bearing 15 in the radial direction cannot be obtained. To be specific, when an adequate amount of lubricating oil is supplied to the rear bearing 15, the lubricating oil flows into between the rear bearing 15 and the housing 16 and serves as a squeeze film damper. However, when the amount of lubricating oil supplied to the rear bearing 15 is small, the effect of the squeeze film damper cannot be expected. To solve these problems, the engine 100 according to the present embodiment includes the rear bearing holding member 18.

The rear bearing holding member 18 is a member that is interposed between the rear bearing 15 and the housing 16 and holds the rear bearing 15. The rear bearing holding member 18 of the present embodiment is formed by a metal plate. As shown in FIG. 3, the rear bearing holding member 18 has a tubular shape that is polygonal when viewed in the axial direction. The rear bearing holding member 18 is inscribed in the housing 16 and circumscribed about the rear bearing 15. To be specific, portions of the rear bearing holding member 18 which portions correspond to vertexes of the polygon are in contact with the housing 16, and intermediate portions each between the adjacent vertexes are in contact with the outer race 32 of the rear bearing 15.

The rear bearing holding member 18 is fixed to the housing 16. Moreover, the rear bearing holding member 18 holds the outer race 32 of the rear bearing 15. More specifically, the rear bearing holding member 18 holds the outer race 28 of the rear bearing 15 such that the outer race 28 is slidable in the axial direction. Therefore, even if the positioning error between the housing 16 and the rotating shaft 13 in the axial direction occurs by the thermal expansion, the outer race 32 of the rear bearing 15 moves in the axial direction relative to the housing 16, and therefore, a large positioning error does not occur between the outer race 32 and the inner race 31 of the rear bearing 15. With this, the breakage of the rear bearing 15 can be avoided.

Moreover, the rear bearing holding member 18 elastically deforms, and for example, by friction between the rear bearing holding member 18 and the housing 16, portions of the rear bearing holding member 18 which portions hold the rear bearing 15 (i.e., portions of the rear bearing holding member 18 which portions are in contact with the rear bearing 15) move in the radial direction relative to the housing 16 while attenuating vibration of the rear bearing 15. To be specific, the rear bearing holding member 18 holds the rear bearing 15 such that the rear bearing 15 is movable in the radial direction relative to the housing 16 while being attenuated. Therefore, the rear bearing holding member 18 serves as a damper that attenuates the vibration of the rear bearing 15 in the radial direction.

Figure 4:
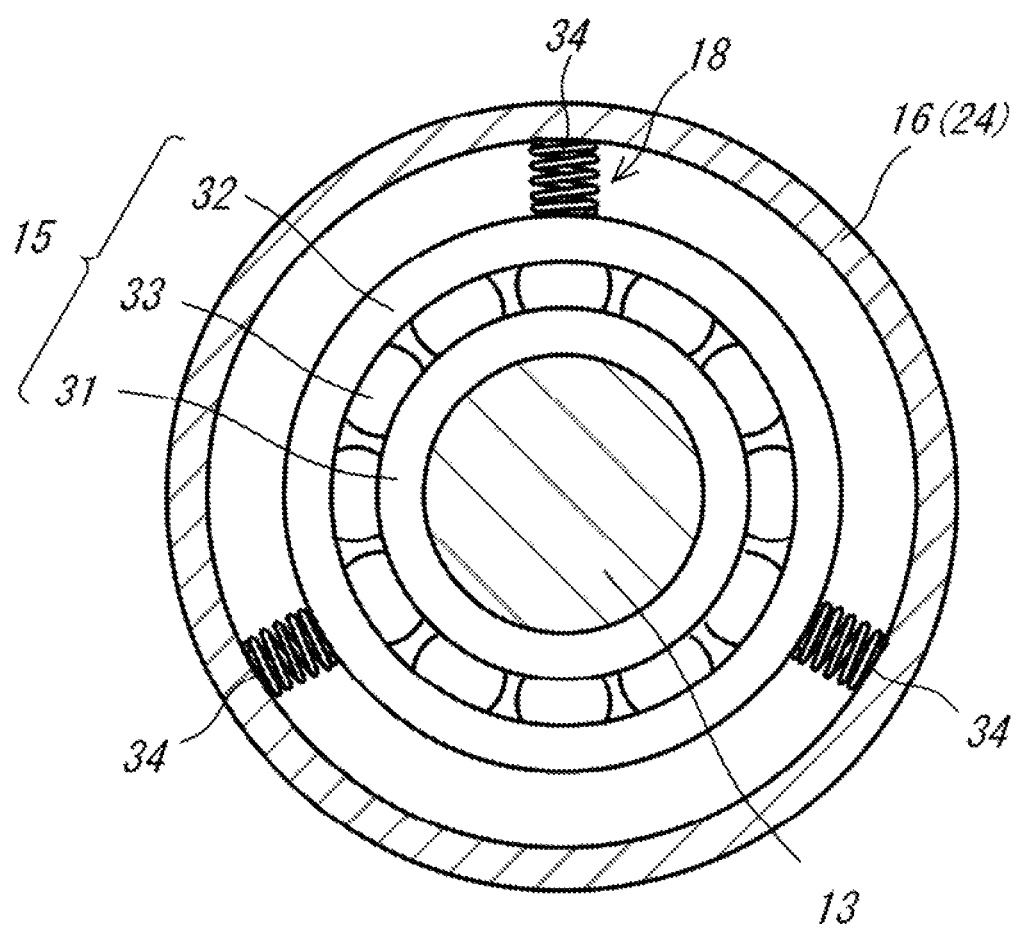
FIG. 4 is a diagram showing the rear bearing of a modified example and its vicinity when viewed in the axial direction.

The rear bearing holding member 18 is not limited to the configuration shown in FIG. 3. For example, the rear bearing holding member 18 may have the configuration shown in FIG. 4. FIG. 4 is a diagram showing the rear bearing holding member 18 of a modified example and its vicinity when viewed in the axial direction. The rear bearing holding member 18 of the modified example includes elastic members 34. The elastic members 34 are so-called coil springs and are arranged at intervals in the circumferential direction of the rear bearing 15. Each elastic member 34 is located between the rear bearing 15 and the housing 16, and both end portions of the elastic member 34 are respectively fixed to the outer race 32 of the rear bearing 15 and the housing 16. To be specific, each elastic member 34 couples the outer race 32 of the rear bearing 15 and the housing 16.

The elastic member 34 is elastically deformable in the axial direction and the radial direction of the rear bearing 15. Therefore, a portion of the elastic member 34 which portion is coupled to the rear bearing 15 is movable in the axial direction relative to the housing 16. However, since the vibration damping effect of this configuration in the radial direction is smaller than that of the configuration shown in FIG. 3, the configuration shown in FIG. 3 is more desirable from the viewpoint of the vibration damping effect. Moreover, the rear bearing holding member 18 may have a configuration other than the configurations shown in FIGS. 3 and 4. For example, the rear bearing holding member 18 may be configured by combining a member that elastically deforms in the axial direction of the rear bearing 15 and a member that elastically deforms in the radial direction of the rear bearing 15.

As above, a gas turbine engine according to the present embodiment includes: a compressor that compresses air which has been taken in; a combustor that sprays a fuel to the air compressed by the compressor and combusts the fuel; a turbine that is rotated by energy of a combustion gas generated by the combustor; a rotating shaft that couples the compressor and the turbine; a rear bearing that is a cageless ball bearing including an inner race, an outer race, and a ball, the inner race being fixed to a portion of the rotating shaft which portion is close to the turbine; a housing to which the rear bearing is attached; and a rear bearing holding member that is interposed between the rear bearing and the housing and holds the outer race of the rear bearing such that the outer race of the rear bearing is movable in an axial direction relative to the housing.

As above, in the gas turbine engine according to the present embodiment, the outer race of the rear bearing is held so as to be movable in the axial direction relative to the housing. Therefore, even if the positioning error between the housing and the rotating shaft in the axial direction occurs by the thermal expansion, a large positioning error between the outer race and the inner race of the rear bearing does not occur, and therefore, the breakage of the rear bearing can be avoided. On this account, in the gas turbine engine according to the present embodiment, a cageless ball bearing whose seizure hardly occurs can be adopted as the rear bearing.

Moreover, the gas turbine engine according to the present embodiment further includes a front bearing including an inner race, an outer race, and a ball, the inner race being fixed to a portion of the rotating shaft which portion is close to the compressor, the outer race being fixed to the housing so as not to be movable in the axial direction relative to the housing.

As above, in the gas turbine engine according to the present embodiment, the rear bearing is movable in the axial direction relative to the housing, and the front bearing is fixed so as not to be movable in the axial direction relative to the housing. With this, the rotating shaft can be stably held.

Moreover, in the gas turbine engine according to the present embodiment, the rear bearing holding member holds the outer race of the rear bearing such that the rear bearing is movable in a radial direction relative to the housing.

Therefore, even if the rear bearing moves in the radial direction by vibration or the like, the rear bearing holding member can hold the rear bearing.

Moreover, in the gas turbine engine according to the present embodiment, a portion of the rear bearing holding member which portion holds the outer race of the rear bearing is movable in the radial direction relative to the housing while attenuating vibration of the rear bearing.

According to this configuration, the rear bearing holding member can hold the rear bearing such that the rear bearing is movable in both the axial direction and the radial direction relative to the housing. As a result, the breakage of the rear bearing during the operation of the gas turbine engine can be prevented, and the vibration of the rear bearing in the radial direction can be attenuated.

Moreover, in the gas turbine engine according to the modified example of the present embodiment, the rear bearing holding member includes an elastic member that is elastically deformable in the axial direction and the radial direction relative to the housing, and the rear bearing holding member holds the rear bearing through the elastic member.

According to this configuration, the rear bearing holding member can hold the rear bearing such that the rear bearing is movable in both the axial direction and the radial direction relative to the housing. As a result, the breakage of the rear bearing during the operation of the gas turbine engine can be prevented.

Moreover, in the gas turbine engine according to the present embodiment, the rear bearing is a ceramic bearing in which the inner race, the outer race, and the ball are made of ceramics or a hybrid bearing in which the inner race and the outer race are made of metal, and the ball is made of ceramics.

Since the rear bearing is the ceramic bearing or the hybrid bearing, the seizure of the rear bearing can be further suppressed.

Moreover, the gas turbine engine according to the present embodiment further includes a non-circulation lubricator that injects lubricating oil to the rear bearing.

As above, when the lubricator is a non-circulation lubricator, the manufacturing cost of the lubricator can be suppressed. Moreover, when the lubricator is a non-circulation lubricator, various problems tend to occur since the amount of lubricating oil supplied to the rear bearing is small. However, since the gas turbine engine includes the above rear bearing holding member, these problems can be solved.

The invention claimed is:

1. A gas turbine engine comprising:
a compressor that compresses air which has been taken in;
a combustor that sprays a fuel to the air compressed by the compressor and combusts the fuel;
a turbine that is rotated by energy of a combustion gas generated by the combustor;
a rotating shaft that couples the compressor and the turbine;
a rear bearing that is a cageless ball bearing including an inner race, an outer race, and a ball, the inner race being fixed to a portion of the rotating shaft which portion is close to the turbine;
a housing to which the rear bearing is attached; and
a rear bearing holding member that is interposed between the rear bearing and the housing, is fixed to the housing, holds the outer race of the rear bearing such that the outer race of the rear bearing is movable in an axial direction relative to the rear bearing holding member, and therefore, holds the outer race of the rear bearing such that the outer race of the rear bearing is movable in the axial direction relative to the housing.

2. The gas turbine engine according to claim 1, further comprising a front bearing including an inner race, an outer race, and a ball, the inner race being fixed to a portion of the rotating shaft which portion is close to the compressor, the outer race being fixed to the housing so as not to be movable in the axial direction relative to the housing.

3. The gas turbine engine according to claim 1, wherein the rear bearing holding member holds the outer race of the rear bearing such that the rear bearing is movable in a radial direction relative to the housing.

4. The gas turbine engine according to claim 3, wherein a portion of the rear bearing holding member which portion holds the outer race of the rear bearing is movable in the radial direction relative to the housing while attenuating vibration of the rear bearing.

5. The gas turbine engine according to claim 3, wherein:
the rear bearing holding member includes an elastic member that is elastically deformable in the axial direction and the radial direction relative to the housing; and
the rear bearing holding member holds the rear bearing through the elastic member.

6. The gas turbine engine according to claim 1, wherein the rear bearing is a ceramic bearing in which the inner race, the outer race, and the ball are made of ceramics or a hybrid bearing in which the inner race and the outer race are made of metal, and the ball is made of ceramics.

7. The gas turbine engine according to claim 1, further comprising a non-circulation lubricator that injects lubricating oil to the rear bearing.

* * * * *